United States Patent [19]

Hachiya et al.

[11] Patent Number: 5,719,254

[45] Date of Patent: Feb. 17, 1998

[54] DISCOLORATION-INSUSCEPTIBLE POLYCARBONATE COMPOSITION

[75] Inventors: Hiroshi Hachiya; Kyosuke Komiya, both of Kurashiki, Japan

[73] Assignee: Asahi Kasei Kogyo Kabushiki Kaisha, Osaka, Japan

[21] Appl. No.: 705,950

[22] Filed: Aug. 30, 1996

[30] Foreign Application Priority Data

Aug. 30, 1995 [JP] Japan .................................. 7-221958

[51] Int. Cl.$^6$ .................................................. C08G 64/00
[52] U.S. Cl. ............................................ 528/196; 528/198
[58] Field of Search ................................. 528/196, 198

[56] References Cited

U.S. PATENT DOCUMENTS 5,260,129  11/1993  Scholl et al. ............................ 428/336

FOREIGN PATENT DOCUMENTS

| 4-15222 | 1/1992 | Japan | C08G 64/40 |
| 4-328124 | 11/1992 | Japan | C08G 64/40 |
| 6-287426 | 10/1994 | Japan | C08L 69/00 |

*Primary Examiner*—Terressa Mosley

*Attorney, Agent, or Firm*—Jacobson, Price, Holman & Stern, PLLC

[57] ABSTRACT

Disclosed is a polycarbonate composition comprising (a) an aromatic dihydroxy compound/carbonic diester transesterification polycarbonate having terminal hydroxyl groups in a proportion of at least 20 mole %, based on the molar total of all terminal groups of the polycarbonate, and (b) a phenolic antioxidant in an amount satisfying the following formula (1):

$$20 \times 10^5 M \leq X \leq 20 \times 10^5 M + 2{,}100 \qquad (1)$$

wherein X represents the amount of said phenolic antioxidant (ppm by weight), based on the weight of said polycarbonate, and M represents the amount of said terminal hydroxyl groups (mol/g-polycarbonate).

The polycarbonate composition of the present invention has an advantage in that it is insusceptible to discoloration not only during production thereof and molding of the composition, but also when a molded article produced from the composition experiences high temperature atomosphere. The polycarbonate composition of the present invention can be advantageously used in the various fields where polycarbonates have conventionally been used.

8 Claims, 2 Drawing Sheets

DISCOLORATION-INSUSCEPTIBLE POLYCARBONATE COMPOSITION

BACKGROUND OF THE INVENTION

1. Field of the Invention

The present invention relates to a polycarbonate composition. More particularly, the present invention is concerned with a polycarbonate composition comprising: (a) an aromatic dihydroxy compound/carbonic diester transesterification polycarbonate having terminal hydroxyl groups in a proportion of at least 20 mole %, based on the molar total of all terminal groups of the polycarbonate, and (b) a phenolic antioxidant in an amount within a specific range as determined in accordance with the molar amount of the terminal hydroxyl groups. The transesterification polycarbonate composition of the present invention has an advantage in that it has high heat resistance or thermal stability during and after production thereof, that is, it is insusceptible to discoloration not only during production thereof and molding of the composition, but also when a molded article produced from the composition experiences high temperature atomosphere.

2. Prior Art

Polycarbonates have been widely used in various fields as engineering plastics which have excellent heat resistance, impact resistance and transparency. In recent years, many researches and developments have been made with respect to a process for the production of a polycarbonate by transesterification (which is hereinafter referred to as "transesterification process") as a substitute for a process for the production of a polycarbonate from an aromatic dihydroxy compound, and phosgene which is poisonous and is likely to pollute the environment (hereinafter referred to as the "phosgene process").

However, the transesterification process has a problem in that the polycarbonate produced by transesterification is susceptible to discoloration, as compared to the polycarbonate produced by the phosgene process. This is because the polymerization of a polycarbonate by transesterification needs to be conducted at high temperatures for a prolonged period of time.

For producing a polycarbonatae by transesterification, wherein the polycarabonate is less likely to suffer discoloration during production thereof, various methods have heretofore been proposed. For example, Unexamined Japanese Patent Application Laid-Open Specification No. 2-153923 discloses a method in which a specific reactor is used in order to accelerate the polymerization and suppress discoloration of a polycarbonate. Unexamined Japanese Patent Application Laid-Open Specification Nos. 5-125167, 5-125172, 5-140291 and 5-186582 disclose a method in which a reactor made of a specific material is used for solving the discoloration problem. Unexamined Japanese Patent Application Laid-Open Specification Nos. 5-310906, 6-287426 (corresponding to U.S. Pat. No. 5,455,324) and 5-46843 disclose a method in which a thermal stabilizer is added to a reaction mixture during the polymerization reaction.

On the other hand, many proposals have also been made in which a thermal stabilizer and/or an antioxidant is added to a molten polycarbonate produced by a melt transesterification process in order to suppress discoloration of a polycarbonate during production thereof and impart an improved thermal stability to the produced polycarbonate. For example, Unexamined Japanese Patent Application Laid-Open Specification Nos. 4-15221, 4-15222, 4-36346, 4-328124 and 5-112706 disclose methods in which various stabilizers, such as phosphorus-, epoxy-, phenolic- or sulfonic ester-stabilizers are added to molten polycarbonates.

However, the above-mentioned prior art methods are not satisfactory to obtain polycarbonate compositions having high heat resistance or thermal stability during and after production thereof. Therefore, development of a discoloration-insusceptible polycarbonate composition has been earnestly desired.

SUMMARY OF THE INVENTION

In these situations, the present inventors have made extensive and intensive studies with a view toward developing a transesterification polycarbonate composition which is insusceptible to discoloration. As a result, it has surprisingly been found that, when the proportion of terminal hydroxyl groups in all terminal groups of a transesterification polycarbonate is at least 20 mol %, the polycarbonate is insusceptible to discoloration during production thereof and molding thereof. Conventionally, for the purpose of suppressing the discoloration of a transesterification polycarbonate composition, there have been no proposals in which attention is paid to the proportion of terminal hydroxyl groups in all terminal groups. This is considered to be due to the following well known fact that when the proportion of terminal hydroxyl groups in all terminal groups of a polycarbonate produced by the phosgene process is increased, not only cannot the discoloration be suppressed, but also the thermal stability and hydrolysis resistance of a molded article produced from the polycarbonate become poor. In fact, all the polycarbonate compositions on the market, which are produced by the phosgene process, have hydroxyl terminal groups in a proportion of not more than 15 mole %, based on the molar total of all terminal groups thereof.

During the study, the present inventors noted that a molded article made of a transesterification polycarbonate having terminal hydroxyl groups in a large proportion, based on the molar total of all terminal groups, suffers serious discoloration when a molded article produced from the polycarbonate experiences high temperature atomosphere, although the polycarbonate itself is insusceptible to discoloration during production thereof and molding thereof. Therefore, the present inventors have made further intensive studies on the relation between the amount of the terminal hydroxyl groups and the effect of various thermal stabilizers and antioxidants, with a view toward improving the thermal stability of a transesterification polycarbonate having terminal hydroxyl groups in a large proportion, based on the molar total of all terminal groups. As a result, it has unexpectedly been found that, when a phenolic antioxidant is added to the above-mentioned transesterification polycarbonate in an amount within a specific range as determined in accordance with the molar amount of terminal hydroxyl groups of the polycarbonate, a polycarbonate composition can be obtained by transesterification which is insusceptible to discoloration even when a molded article produced from the composition experiences high temperature atomosphere. The present invention has been completed, based on the above findings.

Therefore, it is a primary object of the present invention to provide a transesterification polycarbonate composition which has high heat resistance or thermal stability during and after production thereof, that is, it is insusceptible to discoloration not only during production thereof and molding of the composition, but also when a molded article produced from the composition experiences high temperature atomosphere.

The foregoing and other objects, features and advantages of the present invention will be apparent from the following detailed description and appended claims taken in connection with accompanying drawings.

Figure 1:
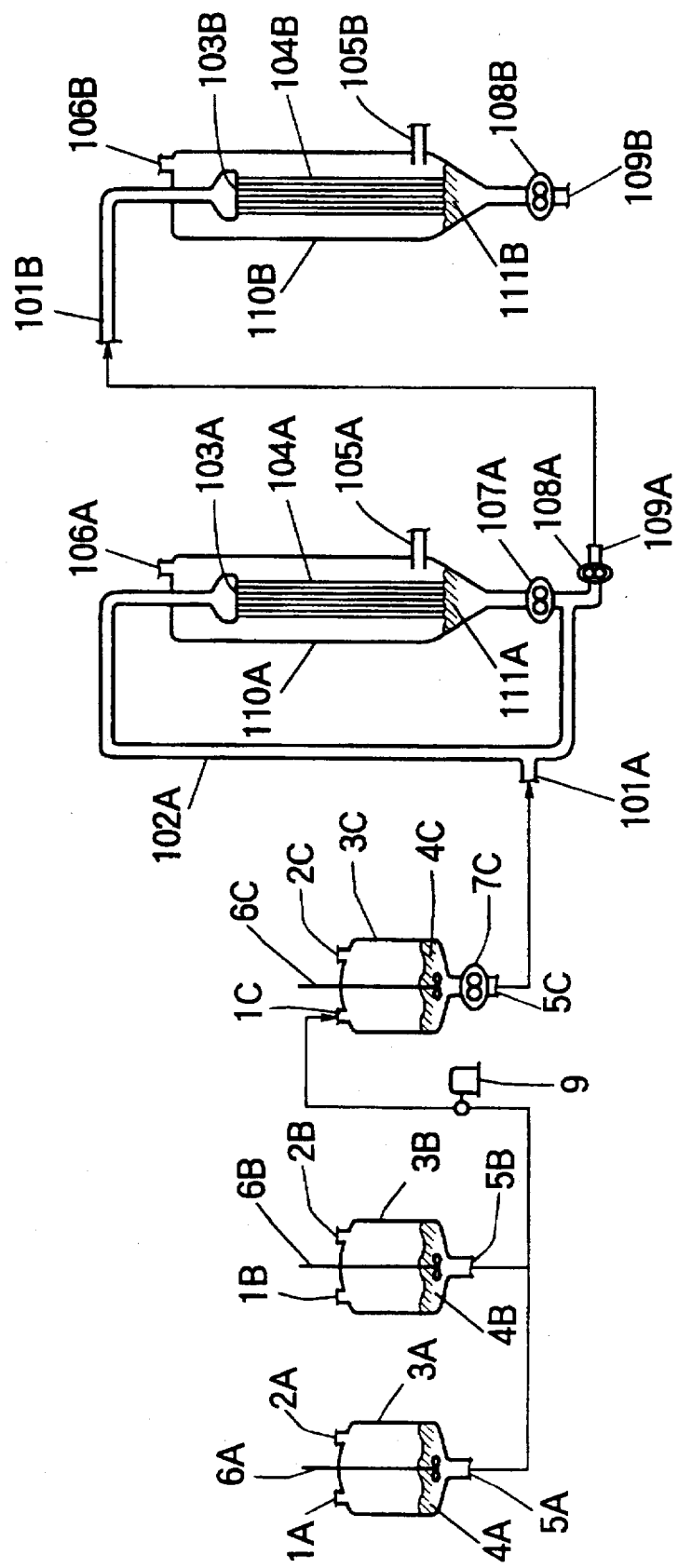
FIG. 1 is a diagram showing the system employed for producing a polycarbonate in Example 1.

DESCRIPTION OF REFERENCE NUMERALS (FIG. 1)
1A–6A: Numerals assigned in connection with first vertical agitation type polymerizer vessel (A)
1B–6B: Numerals assigned in connection with first vertical agitation type polymerizer vessel (B)
1C–7C: Numerals assigned in connection with second vertical agitation type polymerizer vessel (C)
101A–111A: Numerals assigned in connection with first wire-wetting fall polymerizer
101B–111B: Numerals assigned in connection with second wire-wetting fall polymerizer
1A, 1B: Inlet for a starting material
1C: Inlet for a prepolymer
2A, 2B, 2C: Vent
3A, 3B: First vertical agitation type polymerizer vessels (A) and (B)
3C: Second vertical agitation type polymerizer vessel (C)
4A, 4B, 4C: Molten prepolymer
5A, 5B, 5C: Outlet
6A, 6B, 6C: Agitator
7C, 9: Transfer pump
101A, 101B: Inlet for a polymerizing material
102A: Recirculation line
103A, 103B: Perforated plate
104A, 104B: Wire
105A, 105B: Gas feed port
106A, 106B: Vent
107A: Recirculation pump
108A: Transfer pump
108B: Discharge pump
109A, 109B: Outlet
110A, 110B: Main body of wire-wetting fall polymerizer
111A: Molten Prepolymer
111B: Molten Polymer
(FIGS. 2 to 4)
103: Perforated plate
104: Wire
121: Hole of a perforated plate
122: Fixation point of wire
123: Support rod for wire

DETAILED DESCRIPTION OF THE INVENTION

According to the present invention, there is provided a polycarbonate composition comprising:

(a) an aromatic dihydroxy compound/carbonic diester transesterification polycarbonate having terminal hydroxyl groups in a proportion of at least 20 mol %, based on the molar total of all terminal groups of the polycarbonate, and (b) a phenolic antioxidant in an amount satisfying the following formula (1):

 (1)

wherein X represents the amount of the phenolic antioxidant (ppm by weight), based on the weight of the polycarbonate, and M represents the amount of the terminal hydroxyl groups (mol/g-polycarbonate).

For easy understanding of the present invention, the essential features and various embodiments of the present invention are enumerated below.

1. A polycarbonate composition comprising:
   (a) an aromatic dihydroxy compound/carbonic diester transesterification polycarbonate having terminal hydroxyl groups in a proportion of at least 20 mole %, based on the molar total of all terminal groups of the polycarbonate, and
   (b) a phenolic antioxidant in an amount satisfying the following formula (1):

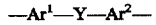 (1)

wherein X represents the amount of the phenolic antioxidant (ppm by weight), based on the weight of the polycarbonate, and M represents the amount of the terminal hydroxyl groups (mol/g-polycarbonate).

2. The polycarbonate composition according to item 1 above, wherein the polycarbonate (a) has terminal hydroxyl groups in a proportion of from 20 to 80%, based on the molar total of all terminal groups of the polycarbonate.

3. The polycarbonate composition according to item 1 or item 2 above, wherein the polycarbonate contains at least one metal selected from an alkali metal and an alkaline earth metal in an amount of not more than 800 ppb by weight, based on the weight of the polycarbonate.

4. The polycarbonate composition according to any of items 1 to 3 above, wherein the phenolic antioxidant is octadecyl-3-(3,5-di-t-butyl-4-hydroxyphenyl) propionate.

In the present invention, the polycarbonate (a) is produced from an aromatic dihydroxy compound and a carbonic diester by transesterification therebetween.

In the present invention, the term "aromatic dihydroxy compound" means a compound represented by the following formula:

HO—Ar—OH wherein Ar represents a divalent aromatic group.

Preferred examples of aromatic groups as Ar include divalent aromatic groups represented by the following formula:

—Ar¹—Y—Ar²— wherein each of $Ar^1$ and $Ar^2$ independently represents a divalent carbocyclic or heterocyclic aromatic group having from 5 to 70 carbon atoms, and Y represents a divalent alkane group having from 1 to 30 carbon atoms.

In the divalent carbocyclic or heterocyclic aromatic groups as $Ar^1$ and $Ar^2$, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Preferred Examples of heterocyclic aromatic groups as $Ar^1$ and $Ar^2$ include aromatic groups having at least one hetero atom, such as a nitrogen atom, an oxygen atom or a sulfur atom.

Illustrative examples of divalent carboxylic or heterocyclic aromatic groups as $Ar^1$ and $Ar^2$ include an unsubstituted or substituted phenylene group, an unsubstituted or substituted biphenylene group and an unsubstituted or substituted pyridylene group. Substituents for these groups are as described above.

Examples of divalent alkane groups as Y include organic groups respectively represented by the following formulae:

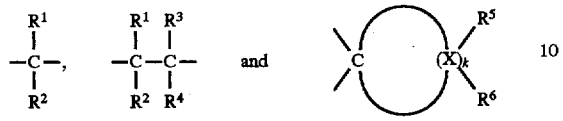

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms and a carbocyclic aralkyl group having from 6 to 10 carbon atoms; k represents an integer of from 3 to 11; each X represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms, wherein $R^5$ and $R^6$ are the same or different;

wherein at least one hydrogen atom of each of $R^1$, $R^2$, $R^3$, $R^4$, $R^5$ and $R^6$ may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and/or a nitro group.

Examples of divalent aromatic groups as Ar include groups respectively represented by the following formulae:

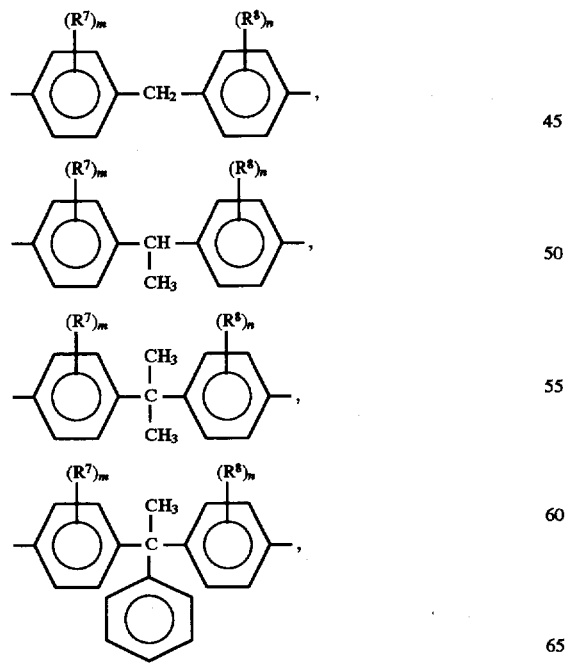

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or a phenyl group; each of m and n independently represents an integer of from 1 to 4, with the proviso that when m is an integer of from 2 to 4, $R^7$'s are the same or different, and when n is an integer of from 2 to 4, $R^8$'s are the same or different.

Further, examples of divalent aromatic groups as Ar also include those which are represented by the following formula:

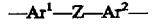

wherein $Ar^1$ and $Ar^2$ are as defined above; and Z represents a single bond, or a divalent group, such as —O—, —CO—, —S—, —SO$_2$—, —SO—, —COO—, or —CON($R^1$)—, wherein $R^1$ is as defined above.

Examples of such divalent aromatic groups as Ar include groups respectively represented by the following formulae:

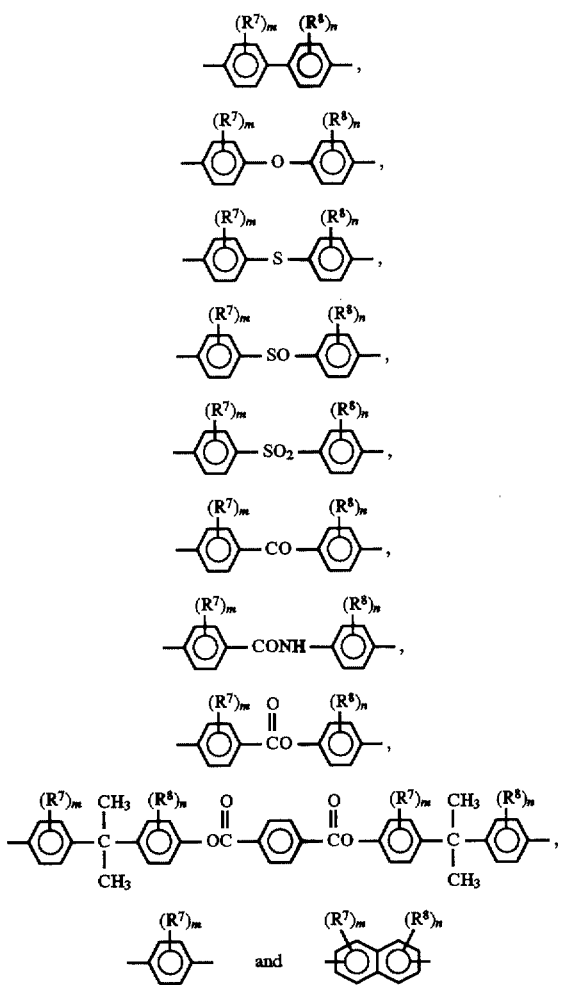

wherein $R^7$, $R^8$, m and n are as defined above.

In the present invention, the aromatic dihydroxy compounds can be used individually or in combination. Representative examples of aromatic dihydroxy compounds include bisphenol A. It is preferred to use an aromatic dihydroxy compound in which the content of a chlorine atom, an alkali metal and an alkaline earth metal is low. It is more preferred to use an aromatic dihydroxy compound substantially free from a chlorine atom, an alkali metal and an alkaline earth metal.

The carbonic diester used in the present invention is represented by the following formula:

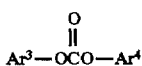

wherein each of $Ar^3$ and $Ar^4$ independently represents a monovalent aromatic group.

In each of $Ar^3$ and $Ar^4$, which independently represents a monovalent carbocyclic or heterocyclic aromatic group, at least one hydrogen atom may be substituted with a substituent which does not adversely affect the reaction, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group. $Ar^3$ and $Ar^4$ are the same or different.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ include those which are respectively represented by the following formulae:

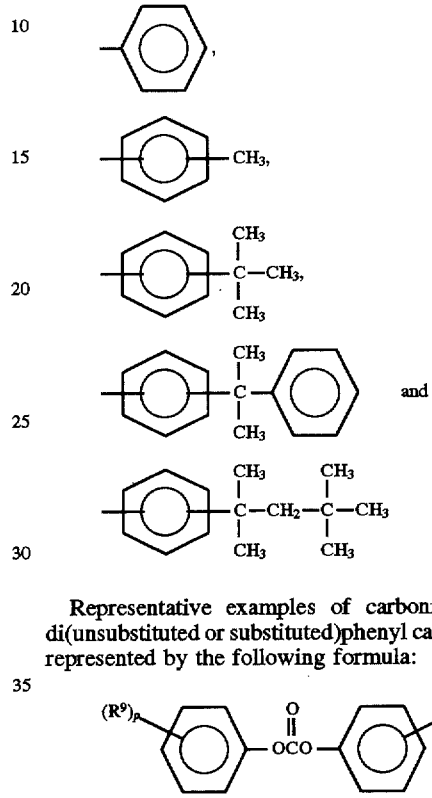

Representative examples of carbonic diesters include di(unsubstituted or substituted)phenyl carbonate compounds represented by the following formula:

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, $R^9$'s are the same or different, and when q is an integer of from 2 or more, $R^{10}$'s are the same or different.

Of these diphenyl carbonate compounds, preferred are those having a symmetrical configuration, such as di(unsubstituted)phenyl carbonate and a diphenyl carbonate wherein the phenyl group is substituted with a lower alkyl group, e.g., ditolyl carbonate and di-t-butylphenyl carbonate. Particularly preferred is diphenyl carbonate which has the simplest structure.

These carbonic diesters may be used individually or in combination. It is preferred that these carbonic diesters have a low content of a chlorine atom, an alkali metal and an alkaline earth metal. It is most preferred that these carbonic diesters are substantially free from a chlorine atom, an alkali metal and alkaline earth metal.

The ratio in which the aromatic dihydroxy compound and the carbonic diester are used (i.e., a charging ratio) may vary depending on the types of the aromatic dihydroxy compound and carbonic diester employed, the polymerization temperature and other polymerization conditions, and the desired molecular weight of a polycarbonate to be obtained and the desired proportions of the terminal groups in the polycarbonate. The carbonic diester is generally used in an amount of from 0.4 to 2.5 moles, preferably from 0.5 to 2.0 moles, more preferably from 0.5 to 1.5 moles, per mole of the aromatic dihydroxy compound.

In the present invention, a polycarbonate having terminal hydroxyl groups in a proportion of at least 20 mol %, based on the molar total of all terminal groups of the polycarbonate, can be produced by controlling the above-mentioned charging ratio of the carbonic diester to the aromatic dihydroxy compound.

Further, in the present invention, an aromatic polyhydric hydroxy compound or an aromatic monohydroxy compound can be used in combination with the above-mentioned aromatic dihydroxy compounds, as long as the effects of the present invention are not spoiled. The aromatic polyhydric hydroxy compound may be used for introducing a branch structure to the polycarbonate. The aromatic monohydroxy compound may be used for converting the terminal hydroxyl groups of the polycarbonate into different types of terminal groups, or for modifying the molecular weight of the polycarbonate.

In the present invention, the molecular weight of polycarbonate (a) is not specifically limited. However, the weight average molecular weight of polycarbonate (a) is generally from 1,000 to 300,000, preferably from 5,000 to 100,000, more preferably from 12,000 to 80,000.

In the present invention, it is requisite that polycarbonate (a) have terminal hydroxyl groups in a proportion of at least 20 mol %, based on the molar total of all terminal groups of the polycarbonate. It is preferred that polycarbonate (a) have terminal hydroxyl groups in a proportion of from 20 to 80 mol %, more preferably from 30 to 70 mol %, based on the molar total of all terminal groups of the polycarbonate. When the proportion of terminal hydroxyl groups in polycarbonate (a) is smaller than the above-mentioned range, the polycarbonate composition suffers discoloration during production thereof. The proportion of terminal hydroxyl groups in polycarbonate (a) can be determined by nuclear magnetic resonance ($^1$H-NMR).

In the polycarbonate composition of the present invention, from the viewpoint of achieving improved insusceptibility to discoloration, it is preferred that polycarbonate (a) be substantially free of a chlorine atom. In the present invention, the term "substantially free of a chlorine atom" means that both the following two requirements are satisfied:

(1) the chlorine atom content must be 0.5 ppm or less, preferably 0.1 ppm or less in terms of chlorine ions as measured by potentiometric titration using an aqueous 1/500N silver nitrate solution or by ion chromatography (0.1 ppm is the detection limit of these measuring methods); and (2) the chlorine atom content must be 10 ppm or less as measured by the combustion method (10 ppm is the detection limit of this method).

In the polycarbonate composition of the present invention, it is preferred that the amount of at least one metal selected from an alkali metal and an alkaline earth metal in the polycarbonate (a) be not more than 800 ppb (parts per billion) by weight, based on the weight of polycarbonate (a). Examples of alkali metals and alkaline earth metals include lithium, sodium, potassium, cesium, magnesium, calcium, strontium and barium. These metals which may be contained in the polycarbonate are, for example, catalyst residues, impurities originating from raw materials used for producing the polycarbonate, and other foreign matters which have entered the polycarbonate during the production thereof. When these metals are present in the polycarbonate, they are present in the form of, for example, ions, salts or complexes with an inorganic compound, salts or complexes with an organic compound. In the present invention, the form of alkali metals and alkaline earth metals which may be present in the polycarbonate is not specifically limited. The measurement of the amount of these metals in the polycarbonate composition can be conducted using a measuring method in which the polycarbonate is subjected to ashing treatment to obtain an ash, and the content of these metals in the obtained ash is measured by atomic absorption spectrometry. When the amount of the alkali metal and/or the alkaline earth metal is larger than the above-mentioned range, the heat resistance and discoloration insusceptibility of the polycarbonate composition tend to become low. It is more preferred that the amount of the alkali metal and/or alkaline earth metal be not more than 400 ppb by weight, more preferably not more than 200 ppb by weight.

In polycarbonate (a) used in the polycarbonate composition of the present invention, it is also preferred that not only the amount of metallic impurities (e.g. iron) other than the alkali metal and/or alkaline earth metal, but also residual monomers, e.g., an aromatic dihydroxy compound, a carbonic diester and a residual aromatic monohydroxy compound be as small as possible. For example, it is preferred that the amount of the metallic impurities other than the alkali metal and/or alkaline earth metal be not more than 1 ppm by weight, based on the weight of polycarbonate (a). It is preferred that the amount of aromatic dihydroxy compound and carbonic diester be not more than 300 ppm by weight, based on the weight of polycarbonate (a). It is preferred that the amount of aromatic monohydroxy compound be not more than 200 ppm by weight, based on the weight of polycarbonate (a). The residual monohydroxy compounds include an aromatic monohydroxy compound by-produced in the polycondensation reaction for producing the polycarbonate, as well as an aromatic monohydroxy compound added to the reaction system as a molecular weight modifier or as an agent for forming a desired terminal group. The amount of metallic impurities other than the alkali metal and/or alkaline earth metal can be measured by the same method as used for measuring the amount of the alkali metal and/or alkaline earth metal. The respective amounts of aromatic dihydroxy compound, carbonic diester and aromatic monohydroxy compound can be measured by high performance liquid chromatography (HPLC) (SCL-6B, manufactured and sold by Shimadzu Corporation, Japan).

Polycarbonate (a) of the polycarbonate composition of the present invention is produced from an aromatic dihydroxy compound and a carbonic diester by transesterification therebetween. The transesterification is conducted while heating in the presence or absence of a catalyst under reduced pressure or under an inert gas flow. The mode of the transesterification process, the polymerization equipment and the like are not specifically limited.

Examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-wall reactor having a perforated plate, and a wire-wetting fall reactor having a perforated plate and at least one wire. These various types of reactors can be used individually or in combination.

In a wall-wetting fall polymerization using a wall-wetting fall reactor, at least one polymerizing material selected from the group consisting of:

a molten monomer mixture of an aromatic dihydroxy compound and a carbonic diester, and a molten prepolymer obtained by reacting an aromatic dihydroxy compound with a carbonic diester, is fed in a molten state to an upper portion of a wall extending downwardly through a wall-wetting fall polymerization reaction zone, and allowed to fall along and in contact with the surface of the wall, thereby effecting the polymerization during the wall-wetting fall thereof.

In a free-fall polymerization using a free-fall reactor, the same polymerizing material as mentioned above is fed in a molten state to a feeding zone having a perforated plate and allowed to pass downwardly through the perforated plate and fall freely through a free-fall polymerization reaction zone, thereby effecting the polymerization during the free-fall.

In a wire-wetting fall polymerization using a wire-wetting fall reactor, the same polymerizing material as mentioned above is fed in a molten state to a feeding zone having a perforated plate and allowed to pass downwardly through the perforated plate and fall along and in contact with a wire through a wire-wetting fall polymerization reaction zone, thereby effecting polymerization of the polymerizing material during the wire-wetting fall thereof.

The perforated plate to be used in a wire-wetting fall polymerization has at least one hole. The feeding zone in the wire-wetting fall reactor communicates, through the hole, with a polymerization zone comprising a wire-wetting fall polymerization reaction zone. The wire-wetting fall polymerization reaction zone has at least one wire in correspondence with the hole, and the wire is securely held at one end thereof in an upper end portion of the wire-wetting fall polymerization reaction zone and extends downwardly through the wire-wetting fall polymerization reaction zone.

With respect to the positional relationship between the at least one wire and the perforated plate, and to the positional relationship between the at least one wire and the at least one hole of the perforated plate, there is no particular limitation as long as a polymerizing material fed to the feeding zone is enabled to pass downwardly through the perforated plate and fall along and in contact with the at least one wire toward the lower end of the at least one wire. The wire and perforated plate either may be or may not be in contact with each other.

Figure 2:
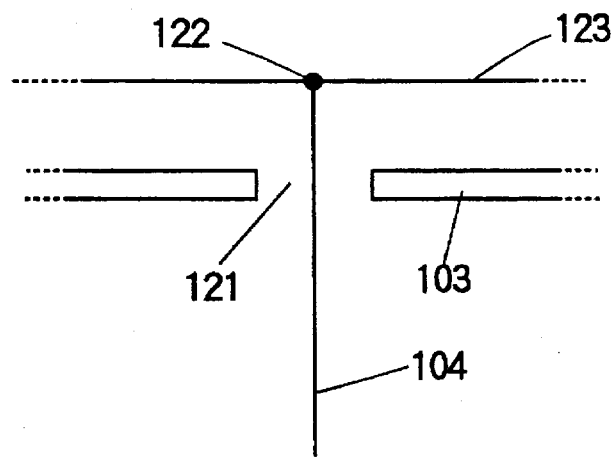
FIGS. 2 to 4 show various manners for securely holding a wire in a wire-wetting fall polymerizer.
Figure 3:
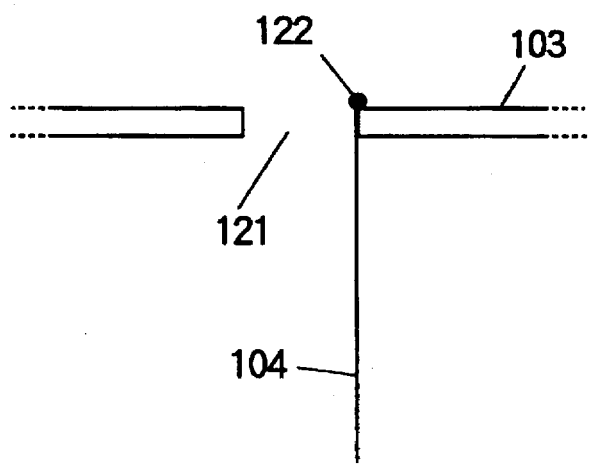
Figure 4:
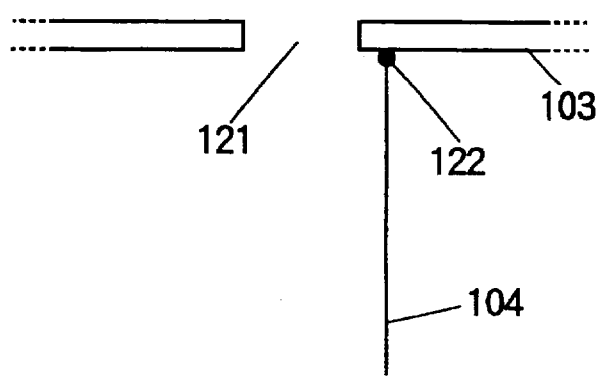

FIGS. 2 to 4 respectively show three examples of manners in which the wire is provided in correspondence with the hole of the perforated plate.

In FIG. 2, the upper end of wire 104 is secured to support rod 123 provided above perforated plate 103, and wire 104 extends downwardly through hole 121 of perforated plate 103. Wire 104 and support rod 123 are secured to each other at fixation point 122. It is possible that support rod 123 be omitted and the upper end of wire 104 be connected, for example, to the upper inner wall surface (not shown) of the wire-wetting fall reactor.

In FIG. 3, the upper end of wire 104 is secured to the upper circumferential edge of hole 121 of perforated plate 103 at fixation point 122, and wire 104 extends downwardly through hole 121 of perforated plate 103.

In FIG. 4, the upper end of wire 104 is secured to the lower surface of perforated plate 103 at fixation point 122, and wire 104 extends downwardly from the lower surface of perforated plate 103.

Alternatively, the upper end of wire 104 may be positioned below hole 121 of perforated plate 103. In such a case, a polymerizing material which has passed downwardly through perforated plate 103 may freely fall before falling along and in contact with wire 104 toward the lower end of wire 104. This embodiment (in which a wire-wetting fall is immediately preceded by a free fall) is enabled, for example, by a method in which a wire is attached to a support rod as shown in FIG. 2, and support rod 123 having wire 104 attached thereto is provided not at a position above perforated plate 103 as shown in FIG. 2, but at a position below perforated plate 103.

Further, the wire-wetting fall polymerization may be followed by a free-fall polymerization wherein a wire-wetting fall polymerized product is consecutively allowed to fall freely through a free-fall polymerization reaction zone after leaving the lower end of the wire, wherein the free-fall polymerization reaction zone is provided downstream of and contiguously to the wire-wetting fall polymerization reaction zone.

The transesterification reaction can be performed by either molten-state polymerization or solid-state polymerization. Further, for example, the transesterification reaction can also be performed by a method in which a molten-state transesterification is first conducted to obtain a prepolymer, and then the obtained prepolymer is subjected to solid-state polymerization under reduced pressure or under an inert gas flow, thereby elevating the polymerization degree.

The temperature for conducting the transesterification is not specifically limited; however, the temperature is generally selected in the range of from 50° C. to 350° C., preferably from 100° C. to 300° C. In general, when the transesterification reaction temperature is higher than the above-mentioned range, the final polycarbonate exhibits marked discoloration and poor thermal stability. In general, when the transesterification reaction temperature is lower than the above-mentioned range, the reaction rate becomes low, so that the reaction becomes impractical. A suitable reaction pressure is selected depending on the molecular weight of the polycarbonate in the reaction system. When the number average molecular weight of the polycarbonate in the reaction system is less than 1,000, a reaction pressure in the range of from 50 mmHg to atmospheric pressure is generally employed. When the number average molecular weight of the polycarbonate in the reaction system is in the range of from 1,000 to 2,000, a reaction pressure in the range of from 3 mmHg to 80 mmHg is generally employed. When the number average molecular weight of the polycarbonate in the reaction system is more than 2,000, a reaction pressure of 10 mmHg or less, preferably 5 mmHg or less is generally employed.

For obtaining the discoloration-insusceptible polycarbonate composition of the present invention, it is preferred that the polymerization be conducted at a temperature of 280° C. or lower, more preferably 270° C. or lower. When the polymerization temperature is higher than 280° C., the amount of an aromatic monohydroxy compound tends to increase. Among the above-mentioned polymerization apparatuses and modes of the transesterification, a surface renewal type twin-screw kneading reactor, a twin-screw horizontal agitation type reactor, a free-fall reactor having a perforated plate, and a wire-wetting fall reactor having a perforated plate and at least one wire, and solid state polymerization method are preferred because the polymerization can be carried out efficiently at a polymerization temperature of 280° C. or lower. Especially preferred are a free-fall reactor having a perforated plate, and a wire-wetting fall reactor having a perforated plate and at least one wire, and solid-state polymerization method.

The polymerization by the transesterification process may be carried out in the absence of a catalyst. However, when it is desired to accelerate the polymerization, the polymerization can be effected in the presence of a catalyst. The polymerization catalysts which are customarily used in the art can be used without particular limitations. Examples of such catalysts include hydroxides of an alkali metal and of an alkaline earth metal, such as lithium hydroxide, sodium hydroxide, potassium hydroxide and calcium hydroxide; alkali metal salts, alkaline earth metal salts and quaternary ammonium salts of boron hydride and of aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula $(R^1 R^2 R^3 R^4)NB(R^1 R^2 R^3 R^4)$ wherein $R^1, R^2, R^3$ and $R^4$ are as defined above, and phosphonium borates represented by the formula $(R^1 R^2 R^3 R^4)PB(R^1 R^2 R^3 R^4)$ wherein $R^1, R^2, R^3$ and $R^4$ are as defined above; silicon compounds, such as silicon oxide, sodium silicate, tetraalkylsilicon, tetraarylsilicon and diphenylethylethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides, zirconium aryloxides and zirconium acetylacetone.

These catalysts can be used individually or in combination. The amount of the catalyst is generally in the range of from $10^{-8}$ to $1\%$ by weight, preferably from $10^{-7}$ to $10^{-1}\%$ by weight, based on the weight of the aromatic dihydroxy compound used as a raw material. When a catalyst comprising an alkali and/or alkaline earth metal is employed and the catalyst residue is not removed after the polymerization, it is preferred that a catalyst comprising an alkali and/or alkaline earth metal be used in an amount such that the polycarbonate produced by the polymerization contains at least one metal selected from the alkali metal and alkaline earth metal in an amount of not more than 800 ppb by weight, based on the weight of the polycarbonate.

The phenolic antioxidant (b) used as a component of the polycarbonate composition of the present invention is represented by the following formula (2):

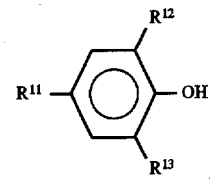

(2)

wherein each of $R^{11}$, $R^{12}$ and $R^{13}$ independently represents a hydrogen atom, a hydroxyl group, an alkoxyl group, or an unsubstituted or substituted hydrocarbon residue, with the proviso that at least one of $R^{11}$, $R^{12}$ and $R^{13}$ represents an unsubstituted or substituted hydrocarbon residue.

Specific examples of the above-mentioned phenolic antioxidants include 2,6-di-t-butyl-p-cresol, 2,6-di-t-butyl-p-anisole, 2,6-di-t-butyl-4-ethylphenol, 2,2'-methylene bis(6-t-butyl-p-cresol), 2,2'-methylene bis(4-ethyl-6-t-butyl-p-phenol), 4,4'-methylene bis(6-t-butyl-p-cresol), 4,4'-butylidene bis(6-t-butyl-m-cresol), tetrakis[methylene-3-(3', 5'-di-t-butyl-4'-hydroxyphenyl)propionate]methane, 4,4'-thio bis(6-t-butyl-m-cresol), stearyl-β-(3,5-di-t-buty-4-hydroxyphenyl)propionate, 1,3,5-trimethyl-2,4,6-tris(3,5-di-t-butyl-4-hydroxybenzyl)benzene, 1,1,3-tris(2-methyl-4-hydroxy-5-t-butylphenyl)butane and triethylene glycolbis [3-(3-t-butyl-5-methyl-4-hydroxyphenyl)propionate].

A preferable phenolic antioxidant is represented by the following formula (3):

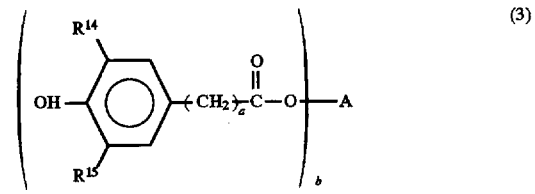

(3)

wherein $R^{14}$ represents a methyl group or a t-butyl group, $R^{15}$ represents a t-butyl group, A represents a $C_1$–$C_{30}$ hydrocarbon residue or a $C_1$–$C_{30}$ heterocyclic residue having a valence of b, a represents an integer of from 1 to 4 and b represent an integer of 1 or more.

Specific examples of the above-mentioned phenolic antioxidants include tetrakis[methylene-3-(3',5'-di-t-butyl-4'-hydroxyphenyl)propionate]methane, octadecyl-3-(3,5-di-t-butyl-4-hydroxyphenyl) propionate and triethylene glycol-bis[3-(3-t-butyl-5-methyl-4-hydroxyphenyl)propionate]. Of these, octadecyl-3-(3,5-di-t-butyl-4-hydroxyphenyl) propionate is preferable.

In the present invention, it is requisite that the polycarbonate composition comprise the phenolic antioxidant (b) in an amount satisfying the following formula (1):

$$20 \times 10^5 M \leq X \leq 20 \times 10^5 M + 2,100 \qquad (1)$$

wherein X represents the amount of said phenolic antioxidant (ppm by weight), based on the weight of said polycarbonate, and M represents the amount of said terminal hydroxyl groups (mol/g-polycarbonate).

The polycarbonate composition comprises the phenolic antioxidant (b) preferably in an amount satisfying the following formula (1'), more preferably in an amount satisfying the following formula (1"):

$$30 \times 10^5 M \leq X \leq 20 \times 10^5 M + 1,600 \qquad (1')$$

$$35 \times 10^5 M \leq X \leq 20 \times 10^5 M + 1,200 \qquad (1'')$$

wherein X and M are as defined above.

When the amount of the phenolic antioxidant (b) is below the range defined by formula (1), a polycarbonate composition having satisfactory thermal stability cannot be obtained. On the other hand, when the amount of the phenolic antioxidant (b) is above the range defined by formula (1), it is likely that smoke is generated and a mold or roll is smudged during molding.

The polycarbonate composition of the present invention can be produced by mixing the polycarbonate (a) with the phenolic antioxidant (b) in the same manner as in conventional methods for mixing a polycarbonate with an additive. Examples of methods for mixing the polycarbonate (a) with the phenolic antioxidant (b) include a method in which (a) and (b) are mixed uniformly using a Henschel mixer, a super mixer, a tumbling mixer, a ribbon blender or the like, and the resultant mixture is subjected to melt-kneading using a single-screw extruder, a twin-screw extruder, a Banbury mixer or the like; and a method in which (a) and (b) are mixed or kneaded in a molten state using a mixing tank, a static mixer, a single-screw, twin-screw or multi-screw extruder or the like. With respect to the temperature of the mixing or kneading in the above-mentioned method, there is no particular limitation, but the mixing or kneading is generally conducted at from 240° to 350° C.

Thermal stabilizers and antioxidants other than the above-mentioned phenolic antioxidant may also be mixed in addition to the phenolic antioxidant. Further, the polycarbonate composition of the present invention may be mixed with additives other than thermal stabilizers and antioxidants, depending on the use of the final product of polycarbonate composition of the present invention. Examples of such additives include a weathering stabilizer, a mold release agent, a lubricant, an antistatic agent, a plasticizer, a polymer, such as a resin other than a polycarbonate or an elastomer, a pigment, a dye, a filler, a reinforcing agent, and a flame retardant. These additives can be used individually or in combination. It is preferred that a phosphorus stabilizer be mixed in addition to the phenolic antioxidant.

Examples of phosphorus stabilizers include phos-phorus-containing acids, phosphorous esters, phosphinic esters, phosphoric esters and phosphonic esters. Representative examples of phosphorus-containing acids include phosphoric acid, phosphorous acid, hypophosphorous acid, pyrophosphoric acid, polyphosphoric acid, phosphinic acids represented by the following formula (4):

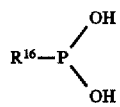

and phosphonic acids represented by the following formula (5):

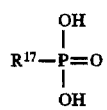

wherein each of $R^{16}$ and $R^{17}$ independently represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a para-nonylphenyl group and a dinonylphenyl group.

More specific examples of phosphinic acids include phenylphosphonic acid.

Examples of phosphorous esters include a phosphorous triester, a phosphorous diester and a phosphorous monoester which are, respectively, represented by the following formulae (6) to (9):

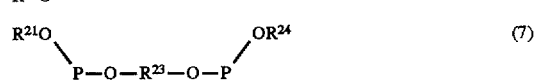

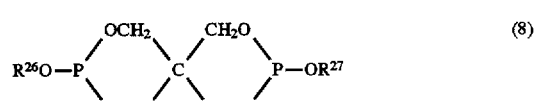

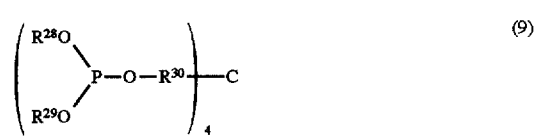

wherein each of $R^{18}$, $R^{19}$, $R^{20}$, $R^{21}$, $R^{22}$, $R^{24}$, $R^{25}$, $R^{26}$, $R^{27}$, $R^{28}$ and $R^{29}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a para-nonylphenyl group and a dinonylphenyl group; and each of $R^{23}$ and $R^{30}$ independently represents alkylene, allylene or arylalkylene.

Specific examples of phosphorous triesters include tris(2,4-di-t-butylphenyl) phosphite, tris(nonylphenyl) phosphite, tris(dinonylphenyl) phosphite, triphenyl phosphite, tetraphenyldipropylene glycol phosphite, tetra(tridecyl)4,4'-isopropylidene diphenyl diphosphite, bis(tridecyl) pentaerythritol diphosphite, bis(nonylphenyl)pentaerythritol diphosphite, bis(2,4-di-t-butylphenyl)pentaerythritol diphosphite, bis(2,6-di-t-butyl-4-methylphenyl) pentaerythritol diphosphite, distearyl pentaerythritol diphosphite, a hydrogenated bisphenol A pentaerythritol phosphite polymer and tetraphenyltetra(tridecyl) pentaerythritol tetraphosphite.

Specific examples of phosphorous diesters include diphenyl hydrogen phosphite, bis(nonylphenyl) hydrogen phosphite, bis(2,4-di-t-butylphenyl) hydrogen phosphite, dicresyl hydrogen phosphite, bis(p-t-butylphenyl) hydrogen phosphite and bis(p-hexylphenyl) hydrogen phosphite.

Specific examples of phosphorous monoesters include phenyl dihydrogen phosphite, nonylphenyl dihydrogen phosphite and 2,4-di-t-butylphenyl dihydrogen phosphite.

Examples of phosphinic esters include phosphinic monoesters and phosphinic diesters represented by the following formulae (10) and (11):

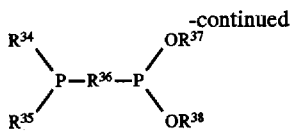

(11)

wherein $R^{31}$ represents an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-t-butylphenyl group, a 2,6-di-t-butylphenyl group, a paranonylphenyl group and a dinonylphenyl group; and each of $R^{32}$, $R^{33}$, $R^{34}$, $R^{35}$, $R^{37}$ and $R^{38}$ independently represents a hydrogen atom; an alkyl group, such as an ethyl group, a butyl group, an octyl group, a cyclohexyl group, a 2-ethylhexyl group, a decyl group, a tridecyl group, a lauryl group, a pentaerythritol group and a stearyl group; an aryl group, such as a phenyl group and a naphthyl group; or an alkylaryl group, such as a tolyl group, a p-t-butylphenyl group, a 2,4-di-tbutylphenyl group, a 2,6-di-t-butylphenyl group, a paranonylphenyl group and a dinonylphenyl group; and $R^{36}$ represents alkylene, allylene or arylalkylene.

A representative example of these compounds is tetrakis (2,4-di-t-butylphenyl) 4,4'-biphenylene diphosphinate.

Examples of phosphoric esters include a phosphoric diester and a phosphoric monoester, which are represented by the following formulae (12) to (15):

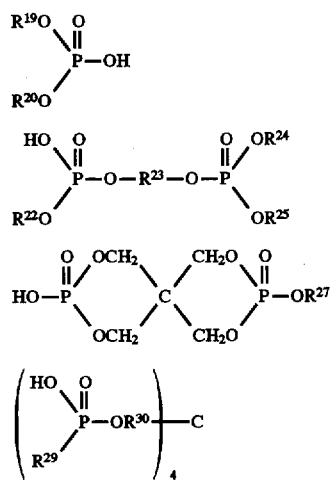

wherein $R^{19}$, $R^{20}$, $R^{22}$, $R^{23}$, $R^{24}$, $R^{25}$, $R^{27}$, $R^{29}$ and $R^{30}$ are as defined above.

Specific examples of phosphoric diesters include diphenylhydrogen phosphate, bis(nonylphenyl) hydrogen phosphate, bis(2,4-di-t-butylphenyl) hydrogen phosphate, dicresyl hydrogen phosphate, bis(p-t-butylphenyl) hydrogen phosphate and bis(p-hexylphenyl) hydrogen phosphate.

Specific examples of phosphoric monoesters include phenyl dihydrogen phosphate, nonylphenyl dihydrogen phosphate and 2,4-di-t-butylphenyl dihydrogen phosphate.

Examples of phosphonic esters include phosphonic monoester represented by the following formulae (16) and (17):

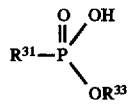

(16)

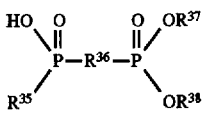

(17)

wherein $R^{31}$, $R^{33}$, $R^{35}$, $R^{36}$, $R^{37}$ and $R^{38}$ are as defined above.

Among these phosphorous stabilizers, phosphorous esters are especially preferred. The amount of stabilizer used is generally selected in the range of from 5 to 3000 ppm, relative to the amount of the polycarbonate.

The polycarbonate composition of the present invention can be advantageously used in various fields where polycarbonates have conventionally been used. For example, the polycarbonate composition of the present invention can be advantageously used in the fields of glazing appliances, electric and electronic appliances, automobiles, appliances for food, miscellaneous goods and polymer alloys.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, various properties were measured as follows.

(1) Measurement of the number average molecular weight and weight average molecular weight of a polycarbonate:

The number average molecular weight and weight average molecular weight of a polycarbonate were measured by gel permeation chromatography (GPC) (column: polystyrene gel; and solvent: THF).

(2) Determination of the proportion of terminal hydroxyl groups in all terminal groups of a polycarbonate, and the amount of terminal hydroxyl groups in a polycarbonate:

The proportion of terminal hydroxyl groups in all terminal groups (mol %) of a polycarbonate was determined by $^1$H-NMR. The amount of the terminal hydroxyl groups in the polycarbonate (mol/g-polycarbonate) was obtained from the proportion of terminal hydroxyl groups and the number average molecular weight of the polycarbonate by calculation.

(3) Measurement of the content of an alkali metal and/or an alkaline earth metal in a polycarbonate:

A polycarbonate was subjected to cold ashing treatment using PLASMA ASHER (LTA-102, manufactured and sold by YANAGIMOTO MFG. CO., LTD., Japan) and the content of an alkali metal and/or an alkaline earth metal in the treated polycarbonate was measured using Flameless Atomic Absorption Spectrophotometer (Z-9000, manufactured and sold by Hitachi Ltd., Japan).

(4) Evaluation of the color of a polycarbonate composition:

A polycarbonate composition was subjected to molding, by means of an injection molding machine (J100E, manufactured and sold by THE JAPAN STEEL WORKS. LTD., Japan), at a cylinder temperature of 290° C. and a mold temperature of 90° C. to obtain a test specimen having a 50 mm length, a 50 mm width and a 3.2 mm thickness. The color of the polycarbonate composition was evaluated, using the specimen, in accordance with the CIELAB method (Comission Internationale de l'E-clairage 1976 L*a*b* Diagram), and the yellowness of the specimen is expressed in terms of the b*-value. The larger the b*-value of the specimen, the higher the yellowness of the specimen.

(5) Evaluation of the thermal stability of a polycarbonate composition:

The yellowness (in terms of b*-value) of a specimen of a polycarbonate composition was determined. The specimen was manufactured in the same manner as in item (4) above. Then, the specimen was heated at 140° C. in a Geer oven for 300 hours, and the yellowness of the heated specimen was determined. The difference in yellowness (which difference is expressed in terms of the Δb*-value) between the unheated specimen and the heated specimen was taken as an index of the thermal stability of the specimen. The smaller the Δb*-value of the specimen, the higher the thermal stability of the specimen.

EXAMPLE 1

A polycarbonate was produced by melt transesterification in accordance with the system as shown in FIG. 1. The system of FIG. 1 comprises a first stage and a second stage agitation polymerization, and a first stage and a second stage wire-wetting fall polymerization.

In the first stage wire-wetting fall polymerization, first wire-wetting fall polymerizer 110A was used. In the second stage wire-wetting fall polymerization, second wire-wetting fall polymerizer 110B was used. Each of the first and second wire-wetting fall polymerizers is equipped with a perforated plate which has 50 holes having a diameter of 7.5 mm and arranged in a zigzag configuration. In each of the first and second wire-wetting fall polymerizers, 50 strands of 1 mmφ SUS 316 L wires are hung vertically from the respective holes of the perforated plate to a reservoir portion at the bottom of the wire-wetting fall polymerizer 110 so that a polymerizing material will not fall freely (i.e., not free-fall) but fall along and in contact with the wires (i.e., wire-wetting fall). Illustratively stated, as shown in FIG. 2, each wire 104 is secured at the upper end thereof to support rod 123 provided above perforated plate 103, and extends downwardly through hole 121 of perforated plate 103. In each of the first and second wire-wetting fall polymerizers, the wire-wetting fall distance is 4 m. Only first wire-wetting fall polymerizer 110A has a recirculation line.

The first stage agitation polymerization was batchwise conducted in first agitation type polymerizer vessels 3A and 3B, each having a capacity of 100 liters, whereas the second stage agitation polymerization in second agitation type polymerizer vessel 3C, having a capacity of 50 liters, and the first stage and second stage wire-wetting fall polymerizations in first and second wire-wetting fall polymerizers 110A and 110B, were continuously conducted.

The polymerization reaction conditions in both of first agitation type polymerizer vessels 3A and 3B were as follows: the reaction temperature was 180° C., the reaction pressure was atmospheric pressure, and the flow rate of nitrogen gas was 1 liter/hr.

In operation, polymerizing materials [a monomer mixture of bisphenol A and diphenyl carbonate (each being substantially free of a chlorine atom) in a molar ratio of 1:1.05 and, as a catalyst, a disodium salt of bisphenol A (molar ratio of disodium salt of bisphenol A to bisphenol A in the monomer mixture was $2.8 \times 10^{-8}$:1)] were charged into each of first agitation type polymerizer vessels 3A and 3B. The monomer mixture in polymerizer 3A was polymerized in a molten state while agitating for 5 hours to obtain prepolymer 4A. Outlet 5A was opened, and prepolymer 4A was fed to second agitation type polymerizer vessel 3C, having a capacity of 50 liters, at a flow rate of 5 liters/hr.

While feeding prepolymer 4A obtained in first agitation type polymerizer vessel 3A to second agitation type polymerizer vessel 3C, first agitation type polymerizer vessel 3B was operated to polymerize the monomer mixture of bisphenol A and diphenyl carbonate in the same manner as in the agitation polymerization in first agitation type polymerizer vessel 3A, to obtain prepolymer 4B.

When first agitation type polymerizer vessel 3A became empty, outlet 5A of polymerizer 3A was closed and, instead, outlet 5B of polymerizer 3B was opened, so that prepolymer 4B was fed from first agitation type polymerizer vessel 3B to second agitation type polymerizer vessel 3C at a flow rate of 5 liters/hr. In this instance, the same polymerizing materials as mentioned above were charged in polymerizer 3A. While feeding prepolymer 4B obtained in first agitation type polymerizer vessel 3B to second agitation type polymerizer vessel 3C, polymerizer vessel 3A was operated, so that the monomer mixture charged therein was polymerized in the same manner as mentioned above.

With respect to a batchwise polymerization in first agitation type polymerizer vessels 3A and 3B and to the alternate feedings of prepolymers 4A and 4B from polymerizers 3A and 3B to second agitation type polymerizer vessel 3C, the same operation as mentioned above was repeated, so that the prepolymer (either prepolymer 4A or prepolymer 4B, alternately) was continuously fed to second agitation type polymerizer vessel 3C.

In second agitation type polymerizer vessel 3C, a further agitation polymerization of prepolymers 4A and 4B, alternately fed from first agitation type polymerizer vessels 3A and 3B, was continuously carried out under polymerization reaction conditions wherein the reaction temperature was 245° C., the reaction pressure was 70 mmHg and the flow rate of nitrogen gas was 2 liters/hr, thereby obtaining prepolymer 4C.

When the volume of prepolymer 4C in second agitation type polymerizer vessel 3C reached 25 liters, part of prepolymer 4C was continuously fed to first wire-wetting fall polymerizer 110A so that the volume of prepolymer 4C in second agitation type polymerizer vessel 3C was constantly maintained at 25 liters. The feeding of prepolymer 4C to first wire-wetting fall polymerizer 110A was conducted through inlet 101A provided in recirculation line 102A for polymerizer 110A.

In first wire-wetting fall polymerizer 110A, a wire-wetting fall polymerization of prepolymer 4C was continuously carried out under polymerization reaction conditions wherein the reaction temperature was 250° C., and the reaction pressure was 1.5 mmHg and the flow rate of nitrogen gas was 1 liter/hr, thereby obtaining prepolymer 111A, while recirculating a part of obtained prepolymer 111A to the feeding zone (having perforated plate 103A) of first wire-wetting fall polymerizer 110A through recirculation line 102A at a recirculation rate of 200 liters/hr.

When the volume of prepolymer 111A at the bottom of first wire-wetting fall polymerizer 110A reached 10 liters, part of prepolymer 111A was continuously fed to second wire-wetting fall polymerizer 110B so that the volume of prepolymer 111A in first wire-wetting fall polymerizer 110A was constantly maintained at 10 liters.

In second wire-wetting fall polymerizer 110B, a wire-wetting fall polymerization reaction was continuously carried out under polymerization reaction conditions wherein the reaction temperature was 250° C., and the reaction pressure was 0.6 mmHg and the flow rate of nitrogen gas was 1 liter/hr, thereby obtaining polycarbonate composition 111B.

When the volume of polycarbonate composition 111B at the bottom of second wire-wetting fall polymerizer 110B reached 10 liters, polycarbonate composition 111B was continuously withdrawn from second wire-wetting fall polymerizer 110B through outlet 109B by means of discharge pump 108B so that the volume of polycarbonate composition 111B in second wire-wetting fall polymerizer 110B was constantly maintained at 10 liters.

The above-mentioned series of polymerization reactions was continuously carried out for 700 hours.

The polycarbonate was substantially free of a chlorine atom, and had terminal hydroxyl groups in a proportion of 48 mol %, based on the molar total of all terminal groups of the polycarbonate, and a weight average molecular weight of 25,100. The amount of terminal hydroxyl groups contained in the polycarbonate was $9.6 \times 10^{-5}$ (mol/g-polycarbonate). Further, in the polycarbonate, the content of sodium (alkali metal) was 5 ppb by weight.

The above-obtained polycarbonate was blended with 1,000 ppm of octadecyl-3-(3,5-di-t-butyl-4-hydroxyphenyl) propionate as a phenolic antioxidant to thereby obtain a polycarbonate composition.

With respect to the obtained polycarbonate composition, the color and thermal stability were evaluated by the above-mentioned methods. Results are shown in Table 1.

EXAMPLES 2 AND 3, AND COMPARATIVE EXAMPLES 1 TO 3

The production of a polycarbonate composition and the evaluation of the obtained polycarbonate compositions were conducted in substantially the same manner as in Example 1, except that the amount of the phenolic antioxidant was 0 ppm (Comparative Example 1), 150 ppm (Comparative Example 2), 500 ppm (Example 2), 1,200 ppm (Example 3) or 3,000 ppm (Comparative Example 3). Results are shown in Table 1. Further, in Comparative Example 3, vigorous occurrence of mold smudge was observed.

EXAMPLE 4

The polymerization reaction was conducted in substantially the same manner as in Example 1, except that the diphenyl carbonate was used in an amount such that the molar ratio of bisphenol A to diphenyl carbonate became 1:1.10. The obtained polycarbonate had terminal hydroxyl groups in a proportion of 23 mol %, based on the molar total of all terminal groups of the polycarbonate, and a weight average molecular weight of 24800. The amount of terminal hydroxyl groups contained in the polycarbonate was $4.6 \times 10^{-5}$ (mol/g-polycarbonate). The obtained polycarbonate was blended with 150 ppm of octadecyl-3-(3,5-di-t-butyl-4-hydroxyphenyl) propionate as a phenolic antioxidant to thereby obtain a polycarbonate composition. With respect to the obtained polycarbonate composition, the color and thermal stability were evaluated by the above-mentioned methods. Results are shown in Table 1.

EXAMPLE 5

The polymerization reaction was conducted in substantially the same manner as in Example 1, except that the diphenyl carbonate was used in an amount such that the molar ratio of bisphenol A to diphenyl carbonate became 1:0.90. The obtained polycarbonate had terminal hydroxyl Groups in a proportion of 72 mol %, based on the molar total of all terminal Groups of the polycarbonate, and a weight average molecular weight of 25300. The amount of terminal hydroxyl Groups contained in the polycarbonate was $14.3 \times 10^{-5}$ (mol/g-polycarbonate). The obtained polycarbonate was blended with 1000 ppm of octadecyl-3-(3,5-di-t-butyl-4-hydroxyphenyl) propionate as a phenolic antioxidant to thereby obtain a polycarbonate composition. With respect to the obtained polycarbonate composition, the color and thermal stability were evaluated by the above-mentioned methods. Results are shown in Table 1.

COMPARATIVE EXAMPLE 4

35 kg of polymerizing materials [monomer mixture of bisphenol A and diphenyl carbonate in a molar ratio of 1:1.20 and, as a catalyst, a disodium salt of bisphenol A (molar ratio of disodium salt of bisphenol A to bisphenol A in the monomer mixture was $2.8 \times 10^{-8}$:1)] were charged into an agitation type polymerizer vessel and were molten at 180° C. under atmospheric pressure. After the agitation at 180° C. for 2 hours under atmospheric pressure, the temperature of the polymerizer vessel was gradually elevated and the pressure in the vessel was gradually reduced as follows, to thereby advance the polymerization. The reaction mixture was held while agitating, first, at 240° C. under 15 mmHg for 1 hour, second, at 260° C. under 5 mmHg for 3 hours, and finally, at 280° C. under 0.1 mmHg for 5 hours.

The obtained polycarbonate had terminal hydroxyl groups in a proportion of 4 mol %, based on the molar total of all terminal groups of the polycarbonate, and a weight average molecular weight of 24,800. The amount of terminal hydroxyl groups contained in the polycarbonate was $0.8 \times 10^{-5}$ (mol/g-polycarbonate).

The above-obtained polycarbonate was blended with 500 ppm of octadecyl-3-(3,5-di-t-butyl-4-hydroxyphenyl) propionate as a phenolic antioxidant to thereby obtain a polycarbonate composition.

With respect to the obtained polycarbonate composition, the color and thermal stability were evaluated by the above-mentioned methods. Results are shown in Table 1.

COMPARATIVE EXAMPLE 5

The production of a polycarbonate composition and the evaluation of the properties thereof were conducted in the same manner as in Example 1, except that 1000 ppm of tris(nonylphenyl) phosphite, which is widely used as a thermal stabilizer for a polycarbonate, was blended with the polycarbonate in place of the phenolic antioxidant. Results are shown in Table 1.

TABLE 1

|  | Color (b*) | Thermal stability (Δb*) |
|---|---|---|
| Example 1 | 3.3 | 2.8 |
| Example 2 | 3.5 | 3.3 |
| Example 3 | 3.3 | 2.6 |
| Comparative Example 1 | 3.3 | 16.9 |
| Comparative Example 2 | 3.3 | 13.1 |
| Comparative Example 3 | 3.6 | 2.5 |
| Example 4 | 3.8 | 3.6 |
| Example 5 | 3.4 | 3.1 |
| Comparative Example 4 | 5.2 | 4.0 |
| Comparative Example 5 | 3.5 | 16.8 |

INDUSTRIAL APPLICABILITY

The polycarbonate composition of the present invention has an advantage in that it is insusceptible to discoloration not only during production thereof and molding of the composition, but also when a molded article produced from the composition experiences high temperature atomosphere. Accordingly, the polycarbonate composition of the present invention can be advantageously used in various fields where polycarbonates have conventionally been used as materials for appliances, for example, as a material for glazing appliances, electric and electronic appliances, automobile appliances, appliances for food, miscellaneous goods and polymer alloys.

We claim:

1. A polycarbonate composition comprising:
   (a) an aromatic dihydroxy compound/carbonic diester transesterification polycarbonate having terminal hydroxyl groups in a proportion of at least 20 mol %, based on the molar total of all terminal groups of said polycarbonate, and
   (b) a phenolic antioxidant in an amount satisfying the following formula (1):

$$20 \times 10^5 M \leq X \leq 20 \times 10^5 M + 2,100 \quad (1)$$

wherein X represents the amount of said phenolic antioxidant (ppm by weight), based on the weight of said polycarbonate, and M represents the amount of said terminal hydroxyl groups (mol/g-polycarbonate).

2. The polycarbonate composition according to claim 1, wherein said polycarbonate (a) has terminal hydroxyl groups in a proportion of from 20 to 80%, based on the molar total of all terminal groups of said polycarbonate.

3. The polycarbonate composition according to claim 1, wherein said polycarbonate contains at least one metal selected from an alkali metal and an alkaline earth metal in an amount of not more than 800 ppb by weight, based on the weight of said polycarbonate.

4. The polycarbonate composition according to claim 1, wherein said phenolic antioxidant is octadecyl-3-(3,5-di-t-butyl-4-hydroxyphenyl) propionate.

5. A polycarbonate composition according to claim 2, wherein said phenolic antioxidant is octadecyl-3-(3,5-di-t-butyl-4-hydroxyphenyl) propionate.

6. A polycarbonate composition according to claim 3, wherein said phenolic antioxidant is octadecyl-3-(3,5-di-t-butyl-4-hydroxyphenyl) propionate.

7. A color-stable heat-resistant polycarbonate composition having thermal stability and comprising an aromatic dihydroxy compound/carbonic diester transesterification polycarbonate having terminal hydroxy groups in a proportion of at least 20 mole %, based on the molar total of all terminal groups of said polycarbonate.

8. A polycarbonate composition of claim 7, an essential component of which is a phenolic antioxidant.

* * * * *